（12）United States Patent
Kringe et al.

(10) Patent No.: US 12,239,048 B2
(45) Date of Patent: Mar. 4, 2025

(54) METHOD AND APPARATUS FOR DETERMINING COMBINE EFFICIENCY

(71) Applicant: Bushel Plus Ltd, Brandon (CA)

(72) Inventors: Marcel Kringe, Brandon (CA); Christopher Allen Sobchuk, Brandon (CA)

(73) Assignee: Bushel Plus Ltd., Manitoba (CA)

( * ) Notice: Subject to any disclaimer, the term of this patent is extended or adjusted under 35 U.S.C. 154(b) by 72 days.

(21) Appl. No.: 17/931,010

(22) Filed: Sep. 9, 2022

(65) Prior Publication Data

US 2023/0000016 A1    Jan. 5, 2023

Related U.S. Application Data

(63) Continuation of application No. PCT/US2021/022019, filed on Mar. 11, 2021.
(Continued)

(51) Int. Cl.
*A01D 41/127* (2006.01)
*A01D 75/02* (2006.01)
*G01N 1/20* (2006.01)

(52) U.S. Cl.
CPC ......... *A01D 41/1273* (2013.01); *A01D 75/02* (2013.01); *G01N 1/20* (2013.01)

(58) Field of Classification Search
CPC ............ A01D 41/1273; A01D 41/1243; A01D 75/02; A01D 41/1276; G01N 1/20; A01F 12/34; A01F 12/448; A01F 12/48
See application file for complete search history.

(56) References Cited

U.S. PATENT DOCUMENTS

| 2,887,226 A | 5/1959 | Angus |
| 3,439,684 A | 4/1969 | Davidow et al. |
| (Continued) | | |

FOREIGN PATENT DOCUMENTS

| DE | 10062114 | 9/2002 |
| DE | 202015000327 | 2/2015 |
| (Continued) | | |

OTHER PUBLICATIONS

International Search Report and Written Opinion, Application No. PCT/US2021/022019, mailed Jun. 8, 2021, 12 pages.
(Continued)

*Primary Examiner* — Suman K Nath
(74) *Attorney, Agent, or Firm* — Thomas J. Oppold; Larkin Hoffman Daly & Lindgren, Ltd.

(57) ABSTRACT

A system to detect grain loss of a harvester during harvesting operations. The system includes at least two pans magnetically supported on the harvester above a ground surface, by separate electromagnets being electrically isolated from a power source while magnetically supporting the at least two pans. A signal controller generates a release signal when triggered by a user. A signal receiver responsive to the generated release signal electrically connects one of the electromagnets with the power source causing one of the at least two pans to be released to the ground surface while the second electromagnet remains electrically isolated from the power source and magnetically supported on the combine harvester until another release signal is triggered by the user causing the signal receiver to electrically connect the second electromagnet with the power source to release the second pan to the ground surface.

14 Claims, 5 Drawing Sheets

Related U.S. Application Data

(60) Provisional application No. 62/988,164, filed on Mar. 11, 2020.

(56) References Cited

U.S. PATENT DOCUMENTS

| | | | |
|---|---|---|---|
| 3,540,454 | A | 11/1970 | Giebelstein et al. |
| 4,393,704 | A | 7/1983 | Bartko |
| 4,467,818 | A | 8/1984 | Donaldson |
| 5,951,395 | A * | 9/1999 | Peter .................. A01D 41/1273 460/149 |
| 10,045,487 | B1 * | 8/2018 | Robertson ............. A01F 12/185 |
| 10,653,065 | B2 * | 5/2020 | Scherman ............... G01F 19/00 |
| 2011/0130180 | A1 | 6/2011 | Van et al. |
| 2014/0335923 | A1 | 11/2014 | Biggerstaff et al. |
| 2019/0186181 | A1 * | 6/2019 | Robertson ............. H01F 7/1646 |
| 2019/0335659 | A1 | 11/2019 | Kringe |
| 2020/0029499 | A1 | 1/2020 | Scherman et al. |

FOREIGN PATENT DOCUMENTS

| | | |
|---|---|---|
| DE | 102016201413 | 4/2017 |
| DE | 102021003507 | 1/2023 |
| GB | 10150080 | 1/2003 |
| GB | 2387098 | 10/2003 |
| WO | 2018184088 | 10/2018 |

OTHER PUBLICATIONS

Canada Office Action in Canada Application No. 3,003,362, dated Aug. 12, 2024, 6 pages.

European Third Party Observations in European Application No. 18917352.9, dated Aug. 23, 2024, 8 pages (including D10-D11 cited references with translations).

European Third Party Observations in European Application No. 18917352.9, dated Nov. 17, 2022, 95 p. 3 (including D1-D9 cited references with translations).

* cited by examiner

METHOD AND APPARATUS FOR DETERMINING COMBINE EFFICIENCY

CROSS-REFERENCE TO RELATED APPLICATIONS

This application is a continuation of PCT Application No.: PCT/US2021/022019, filed Mar. 11, 2021, which claims priority to U.S. Provisional Application No. 62/988,164 filed Mar. 11, 2020, each of which is incorporated herein in their entireties by reference.

TECHNICAL FIELD

The present disclosure relates generally to a method and apparatus for determining combine efficiency. More particularly, the present disclosure relates a method and apparatus that involve a nested series of collection pans to adequately determine combine efficiency. Specifically, the present disclosure relates to a nested series of collection pans that may be remotely dropped via use of electromagnets to iteratively determine combine efficiency.

BACKGROUND

Agricultural harvesters are commonly known as "combines". This term is derived from the use of multiple harvesting functions, namely being able to "combine" the use of picking a crop, threshing a crop, separating the crop and cleaning the crop desired to be harvested. Many times the combine may include a header which removes the crop from a field, a feeder which moves the crop matter into a threshing rotor which rotates within a perforated housing that allows grain to fall into a grain pan. After the grain pan, the grain is commonly cleaned using a cleaning system that blows air to discharge any chaff, debris or straw before the grain is deposited into a grain tank that is onboard the combine.

Various configurations of many of these mechanisms are required for different types of crops. The moisture content at harvesting, type of crop, amount of chaff, or the amount of straw, are all factors that may require that the combine be adjusted to monitor the combine efficiency. This adjustment may not always be readily apparent, and there may be too much grain lost amongst the chaff, straw or other debris. These lost grains lead to lost profits amongst farmers, an already low margin profession where profits are paramount to survival.

Previous grain loss receptacles have been releasably mounted beneath a body of a combine. A prior art receptacle may be dropped onto the ground during operation of the combine. The receptacle would then be filled with any chaff as well as lost grain that may be inadvertently blown from the combine to the ground. As a result, a single datapoint based on loss may be gathered based on the contents of this single tray. The single tray would then need to be collected, processed, and then reloaded onto the combine.

SUMMARY

As a result, there is a need for a new method and apparatus for determining combine efficiency using multiple trays mounted to a combine and actuatable in new ways.

In one aspect, an exemplary embodiment of the present disclosure may provide at least two pans attached by releasable magnets to a set of magnets on the main cover; a signal controller arranged to generate a signal when triggered by a user and arranged to be located remotely from the at least one pan; at least one electromagnet mounted on the at least one pan and the main cover being operative to electromagnetically retain the at least one pan on a vehicle body when supplied with electrical power; a battery operative to supply the electrical power to said at least one electromagnet in a normal operating mode; and a signal receiver operative to interrupt power to a select number of the at least one electromagnet causing at least one pan to be released from the vehicle body onto the ground in response to receipt of the wireless trigger signal from the signal controller.

In one aspect, another exemplary embodiment of the present disclosure may provide a method of reducing crop loss comprising: providing at least one pan either directly attached or indirectly attached to a combine; using at least one electromagnet mounted on the at least one pan to electromagnetically retain the collection pan on a body of the combine; signaling on a signal controller to release at least one electromagnet; interrupting electrical power supplied to said at least one electromagnet in response to the signaling of the signal controller; dropping a first pan from the vehicle body together with the collection pan onto the ground displacing the combine harvester across the ground such that some of a crop is deposited onto the collection pan; dropping at least one second pan from the vehicle body by repeating the steps of signaling, interrupting and dropping; measuring the amount of crop contained within at least one pan; and adjusting the combine settings as a result of the measurements.

In yet another aspect, an exemplary embodiment of the present disclosure may provide a method of measuring crop loss comprising: providing at least two pans either directly attached or indirectly attached to a combine; providing at least one sensor attached to a combine; using at least one electromagnet mounted on the at least one pan to electromagnetically retain the collection pan on a body of the combine; signaling on a signal controller to release at least one electromagnet; interrupting electrical power supplied to said at least one electromagnet in response to the signaling of the signal controller; dropping a first pan from the vehicle body together with the collection pan onto the ground; displacing the combine harvester across the ground such that some of a crop is deposited onto the collection pan; dropping at least one second pan from the vehicle body by repeating the steps of signaling, interrupting and dropping; and measuring the amount of crop contained within at least one pan; reading a sensor output to determine the amount of crop not staying within the combine; and adjusting the combine settings as a result of the measurements.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale. Similar numbers refer to similar parts throughout the drawings.

FIG. 1 is a rear view of an exemplary cut away combine with an exemplary main cover attached.

DESCRIPTION

A system 10 and method of operation thereof is depicted in the present disclosure and throughout FIGS. 1-5. System 10 is a new and improved apparatus for determining combine efficiency as will be discussed hereafter.

Figure 1:
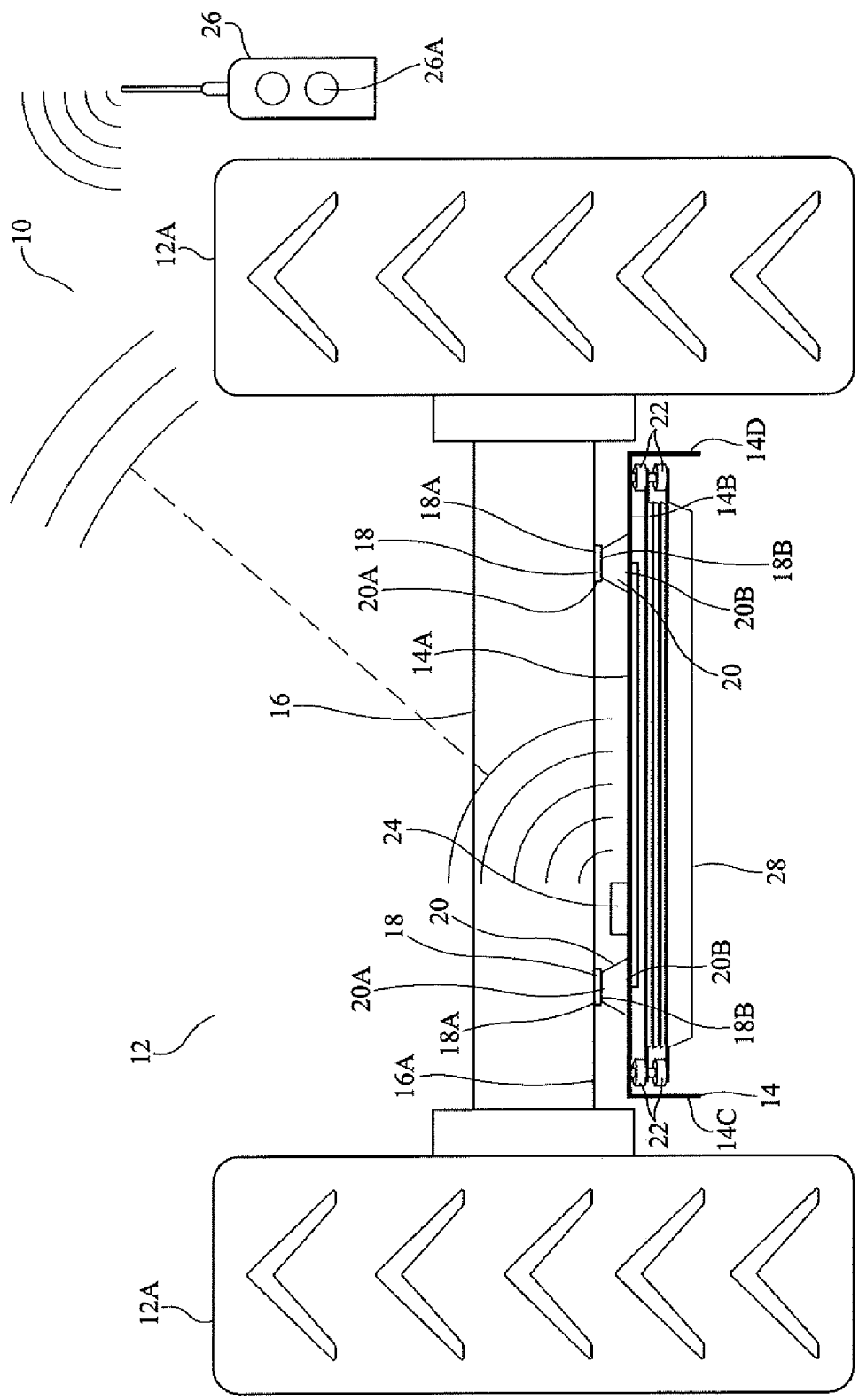

Referring now to FIG. 1, a rear view of an exemplary cutaway agricultural vehicle is shown. In one embodiment, the vehicle is a combine harvester 12 or just combine 12 with an exemplary main cover 14 attached is shown. The combine 12 is shown in only its rear portion with the exemplary main cover 14 mounted on the underside 16A of a back axle housing 16 of the combine at the top side 14A of the main cover 14. The exemplary main cover 14 has a body that is generally open at the bottom. The exemplary main cover includes the top side 14A, an under side 14B that is vertically disposed from the top side 14A, a first side 14C and a second side 14D that is transversely opposed to the first side 14C. In further embodiments there may be a front side that is laterally disposed from a back side, though in this embodiment this front side and back side are omitted. The back axle housing 16 further incudes a top side 16B that is vertically displaced from the underside 16A. The combine 12 further has at least two ground engaging wheels 12A.

The exemplary main cover 14 is engageably and removably mounted to the back axle housing 16 by at least one permanent magnet 18 and at least one bracket 20. The permanent magnet 18 is so named as it may not be removed remotely but rather by force. The permanent magnet 18 has a first end 18A where it interfaces with the back axle housing 16 at the underside 16A and a second end 18B that is vertically disposed from the first end 18A, where the permanent magnet 18 interfaces with the bracket 20 at its first end 20A. The bracket 20 further includes a second end 20B that is vertically disposed from the first end 20A where the bracket 20 interfaces with the main cover 14. In one embodiment the permanent magnet 18 is a permanent electromagnet.

In alternative embodiments, the main cover 14 may be mounted at multiple locations along a combine 12. While the exemplary embodiment is shown as mounted under a back axle housing 16, in alternative embodiments the main cover 14 is mounted is placed underneath the combine.

Further shown as a part of the main cover 14 is a plurality of magnets or electromagnets 22. These plurality of magnets or electromagnets 22 will be described later with respect to location in FIG. 2 and FIG. 3 and operation with respect to FIG. 5. Additionally, shown is a signal receiver 24 and a signal controller 26 operative to transmit a signal to the signal receiver 24. The signal receiver 24 is electrically connected to the plurality of electromagnets 22. The signal receiver 24 is mounted to the underside 14B of the main cover 14. The signal controller 26 and signal receiver 24 will be discussed later with respect to the operation.

Figure 2:
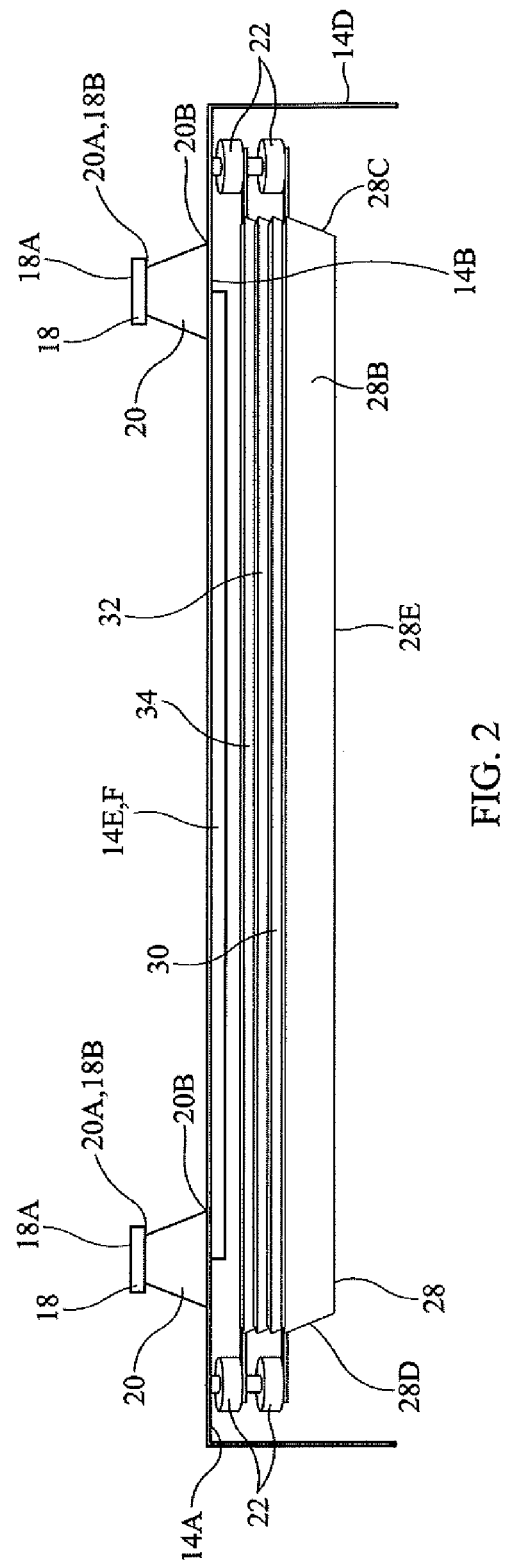
FIG. 2 is an isometric front side view of a set of exemplary pans.
Figure 3:
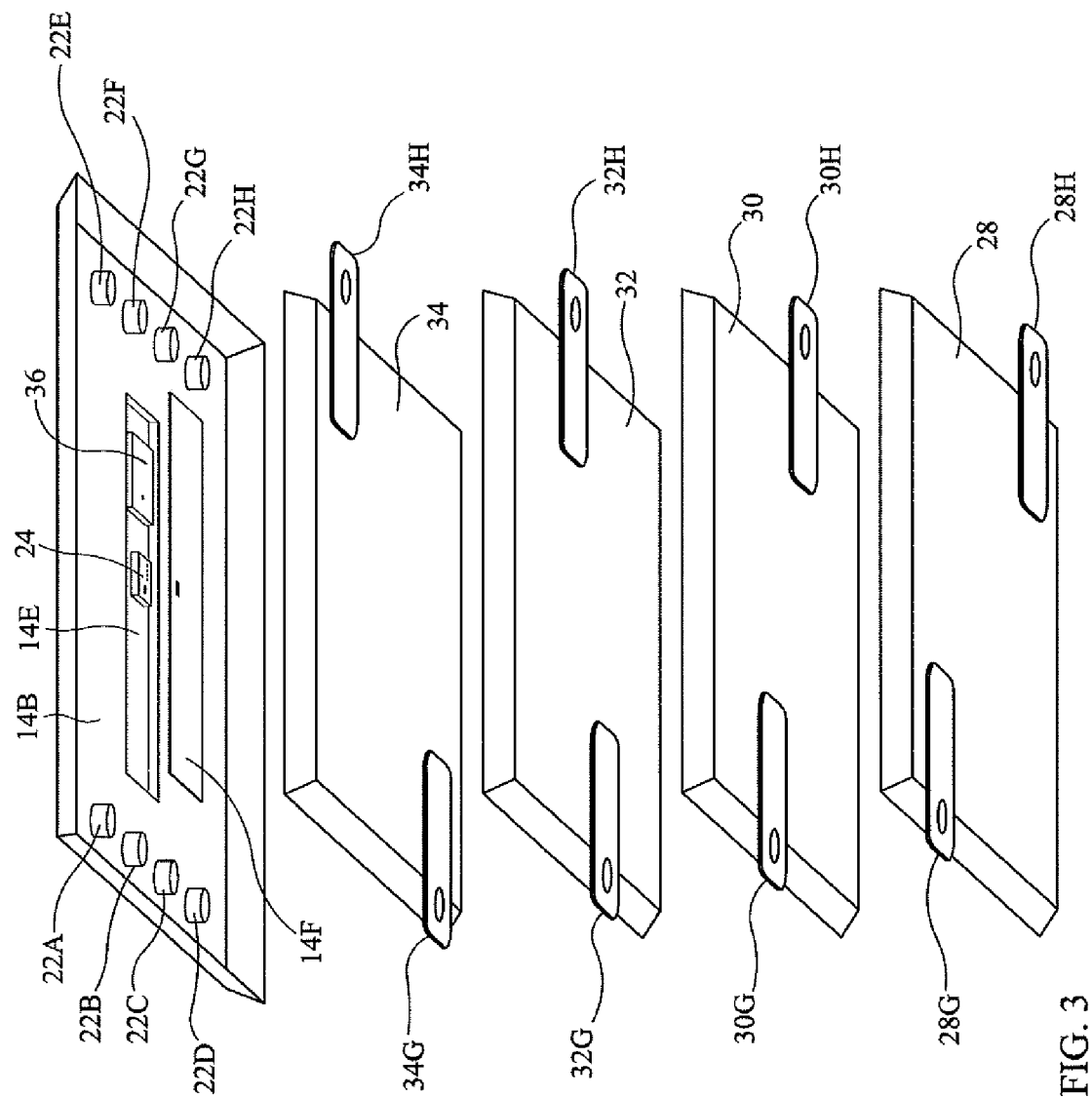
FIG. 3 is an isometric front top right exploded view of the exemplary sets of pans.

FIGS. 2 and 3 show varied views of a set of exemplary pans, 28, 30, 32, 34 of the system 10. The pans 28, 30, 32, 34 have a front side 28A, 30A, 32A, 34A (not shown in this view) a back side 28B, 30B, 32B, 34B that is laterally disposed from the front side 28A, 30A, 32A, 34A, a first side 28C, 30C, 32C, 34C and a second side 28D, 30D, 32D, 34D that is transversely opposed to the first side 28C, 30C, 32C, 34C. Further there is a bottom side 28E, 30E, 32E, 34E that is vertically opposite a top surface 28F, 30F, 32F, 34F. Each of the pans 28, 30, 32, 34 further has at least one tab 28G, 30G, 32G, 34G. The at least one tab 28G, 30G, 32G, 34G is integrally formed as a unibody member with the pans 28, 30, 32, 34. Each of the pans 28, 30, 32, 34 engageably connect to at least one respective magnet or electromagnet 22 at their at least one tab 28G, 30G, 32G, 34G. Each of the pans 28, 30, 32, 34 has a body that with sloped sides and a flat bottom side 28E, 30E, 32E, 34E that allows the pans 28, 30, 32, 34 to nest within one another.

In the exploded view as seen in FIG. 3, there are able to be seen an exemplary eight magnets 22A, 22B, 22C, 22D, 22E, 22F, 22G, 22H. In the exemplary embodiment there are two tabs, a first tab 28G, 30G, 32G, 34G and a second tab 28H, 30H, 32H, 34H. The first pan 28 has the first tab 28G interface with the magnet 22A and the second tab 28H interface with magnet 22H. The second pan 30 has the first tab 30G interface with the magnet 22B and the second tab 30H interface with magnet 22G. The third pan 32 has the first tab 32G interface with the magnet 22C and the second tab 32H interface with magnet 22F. The fourth pan 34 has the first tab 34G interface with the magnet 22D and the second tab 34H interface with magnet 22E. As a result of the staggering of the magnets 22, each pan 28, 30, 32, 34 may be selectively released in order without impeding the other pans.

Further shown in this view with the cover 14 is a groove or recess 14E. This groove or recess 14E along with a cover 14F is operative to enclose a battery module 36 along with a portion of the signal receiver 24. The battery module 36 further includes wiring that may power the signal receiver as well as wiring that interfaces with the magnets 22. In some embodiments the battery module 36 is adjacent to the signal receiver 24.

For the sake of simplicity, all magnets 22A, 22B, 22C, 22D, 22E, 22F, 22G, 22H are shown as the same height. One would understand that in order to properly nest the magnets would have to be at slightly different heights. For example, 22A and 22H may be at a first height, while 22B and 22G would be at a slightly increased second height as the second height would have to compensate for the distance added when the second pan 30 is nested in the first pan 28. Similarly, the magnets 22C and 22F would have a third height greater than that of the second height and the magnets 22D and 22E would have a fourth height greater than that of the third height.

In an alternative embodiment, it is possible to use additional magnets with additional trays. For every additional tray, there would merely need to be two additional magnets. Further, additional systems 10 are able to be deployed around the combine 12, as discussed earlier.

Further, an additional embodiment may not provide for tabs to be used on the trays but instead a nesting configuration with magnets attaching directly to trays at given locations when the trays may be selectively dropped in a method as will be discussed later.

Having thus described an exemplary non-limiting configuration of the system 10, its operation will be discussed with reference to some exemplary features used with the various embodiments.

Figure 4:
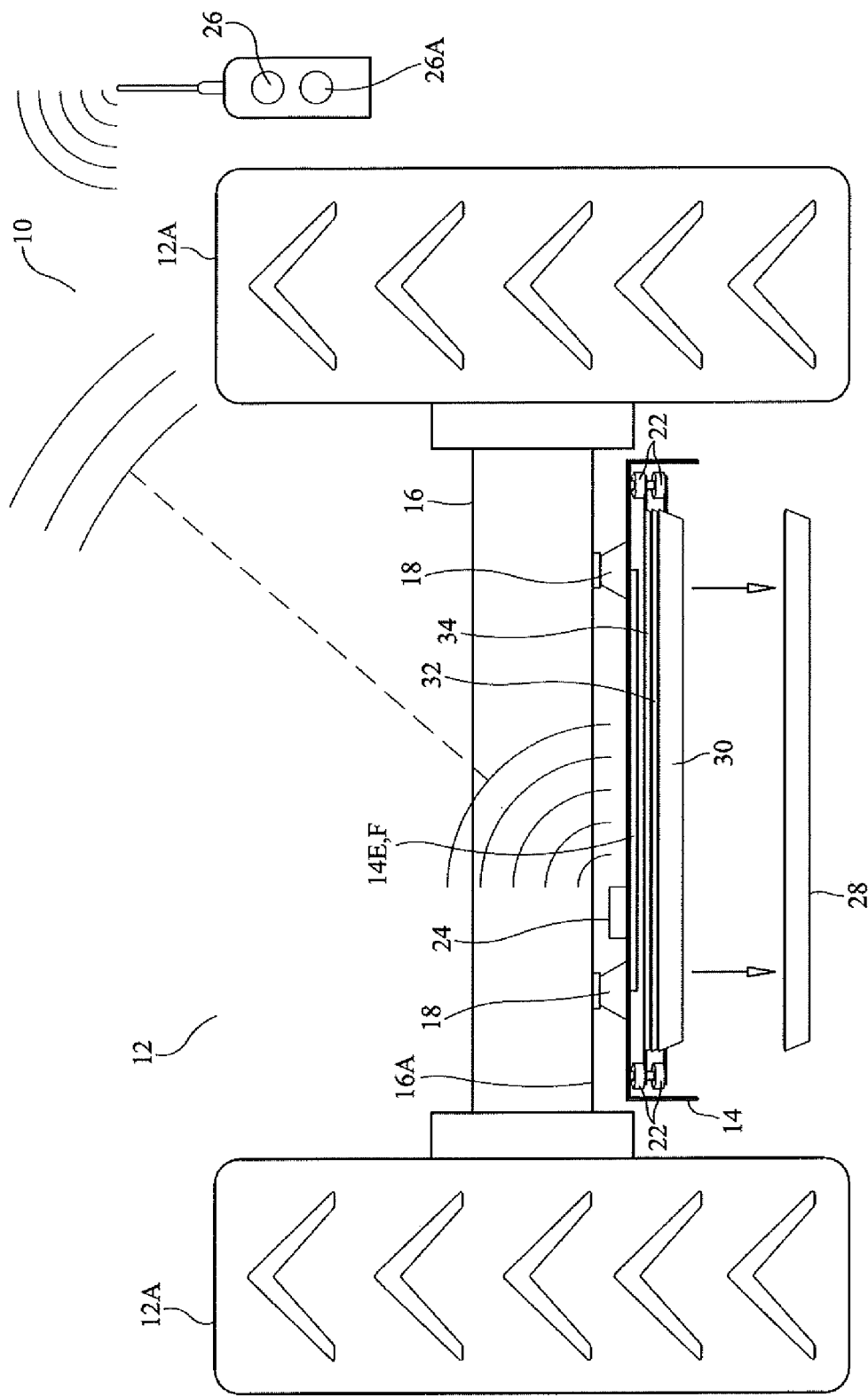
FIG. 4 is an operational rear view of an exemplary pan dropping into a field below.

Referring specifically to FIG. 4, an operational view of an exemplary pan being deployed into a field. As the combine 12 moves across a field, an operator of the combine 12 can decide that a measurement of grain loss is needed. The combine operator actuates the signal controller 26 that transmits a signal to the signal receiver 24. Depending on which of the exemplary pans have been deployed prior and how many signals the signal receiver 24 has received determines which pan to drop. For example, if this is the first signal that the signal receiver 24 has received, the signal receiver may output to drop the first pan 28 through a controller. In an exemplary embodiment, the signal controller 26 can include one or more different types of RF devices such as cellular phones, Wi-Fi enabled devices, Bluetooth devices, etc. Additionally, the signal controller 26 may be wired. The signal receiver 24 would be matched to the controller 26 or vice versa in order to allow the two devices to properly communicate.

The controller, while not shown in the drawings, in one embodiment is mounted within the main cover and is in electrical connection with the battery 36 and magnets 22. The controller is generally recessed relative to the pans 28, 30, 32, 34 so as to not interfere with mounting of the pans relative to the combine 12 body. The controller is operative to control the supply of electrical power from the battery to the magnets and is operable between an off mode and a triggered or on mode. In the off mode, no electric power is being drawn from the battery by the magnets and the least one pan 28, 30, 32, 34 is magnetically retained relative to the combine 12 body by the magnets. In the triggered or on mode, the controller is operative to cause electrical power to the magnets 22 in such a way that the magnets 22 attached to the tabs 28G, 30G, 32G, 34G of the pans 28, 30, 32, 34 are released individually from the combine 12 for dropping the pan into the field. This mechanism for release may be through introducing an electrical signal to the magnet, causing a loss of magnetism, as will be discussed later herein.

The controller includes a receiver for receiving a signal from the signal receiver 24 and is configured to switch from the off mode to the triggered or on mode when the signal is received as well as a memory module responsive to data bearing records. The signal controller 26 has an independent housing with a respective power source therein for being situated remotely from the collection pan, for example with the combine operator. The signal controller 26 can be actuated by an operator that generates a wireless signal and transmits the signal wirelessly to the signal receiver 24 which passes it to the controller which then triggers the controller to interrupt power to the proper magnets 22 for dropping a pan 28, 30, 32, 34 from the body of the combine 12.

In operation, the user positions the at least one pan 28, 30, 32, 34 to be elongate in the lateral direction of the combine harvester and activates the magnets 22 to retain the pan to the underside of the combine 12 body, for example using a button 26A externally located on the signal controller 26 to generate an activation signal transmitted to the signal receiver 24 then transmitted to the controller which switches from the off mode to the triggered or on mode upon receipt of the activation signal. The operator then operates the combine 12 in the usual manner, and selectively triggers the controller to release at least one pan 28, 30, 32, 34 from the combine 12 body as the combine 12 travels across the field. In a known manner, the electromagnets are operable to switch between a default holding state exerting an external magnetic field, and a release state lacking said external magnetic field. The default holding state consumes no electrical power, and thus is also referred to herein as a de-energized state of the electromagnet, while the release state requires application of DC power to an electrical coil of the electromagnet, and is therefore herein as an energized state of the electromagnet. To enable control over the state of the electromagnets, the control circuit containing the wireless transmitter is also connected to the electrical coil of each electromagnet, and is configured to switch between an "off" state electrically isolating the power supply from the coils of the electromagnets, and an "on" state electrically connecting the power supply to the coils electromagnets. The control circuit is configured to maintain the "off" state by default. In response to a command signal sent to the receiver from the transmitter of a wireless controller 26, whether operated by the driver of the combine harvester 12 or other personnel in the proximity thereof, the control circuit momentarily switches to the "on" state, thus delivering a momentary pulse of current from the power supply to the coils of the electromagnets to switch them from the holding state to the release state. After maintaining the "on" or release state of the circuit for the predetermined pulse length, the circuit automatically returns to the "off" or holding state, and remains in such off or holding state until a subsequent command signal is received producing another "on" or release state.

For example, the memory module is operative to contain information regarding the number or sequence of pans that have been dropped. In the exemplary embodiment where there are four pans 28, 30, 32, 34, the memory module may recall the number or which of the four pans that were dropped within its data bearing records and know which magnets to disengage when the signal controller 26 is actuated. The memory module may also be cleared if during a harvest all of the pans were not deployed, and would then be desired to start with an exemplary four pans 28, 30, 32, 34 again.

In one embodiment, four exemplary pans 28, 30, 32 and 34 would be attached to their respective magnets 22. The first pan 28 has the first tab 28G interface with the magnet 22A and the second tab 28H interface with magnet 22H. The second pan 30 has the first tab 30G interface with the magnet 22B and the second tab 30H interface with magnet 22G. The third pan 32 has the first tab 32G interface with the magnet 22C and the second tab 32H interface with magnet 22F. The fourth pan 34 has the first tab 34G interface with the magnet 22D and the second tab 34H interface with magnet 22E. As such, as the first pan 28 is closest to the ground initially in the exemplary embodiment, the memory module would be free of any memory relating to any of the pans having dropped. Then, when the signal controller 26 generates an activation signal, the activation signal is transmitted to the signal receiver 24 which switches from the off mode to the triggered or on mode upon receipt of the activation signal. In the case of the first pan 28, the controller would trigger the magnet 22A and the magnet 22H to trigger the on mode releasing the connection from the first tab 28G and second tab 28H, respectively. This would cause the pan 28 to drop to the ground from the nested configuration with the rest of the pans 30, 32, 34. The memory module would then create a record that may be accessed to remember that the first pan 28 had been deployed.

Continuing onward, the signal controller 26 may generate a further activation signal transmitted to the signal receiver 24 then transmitted to the controller which switches from the off mode to the triggered or on mode upon receipt of the activation signal. The memory module, knowing that the first pan 28 had been dropped, would then drop the second pan 30. In the case of the second pan 30, the controller would trigger the magnet 22B and the magnet 22G to trigger into the on mode and thus release connection from the first tab 30G and second tab 30H, respectively. This would cause the pan 30 to drop to the ground from the nested configuration with the rest of the pans 32, 34. The memory module would then create a record that may be accessed to remember that the second pan 30 had been deployed.

Further, the signal controller 26 may generate another further activation signal transmitted to the signal receiver 24 then transmitted to the controller which switches from the off mode to the triggered or on mode upon receipt of the activation signal. The memory module, knowing that the first pan 28 and second pan 30 had been dropped, would then drop the third pan 32. In the case of the third pan 32, the controller would trigger the magnet 22C and the magnet 22F to trigger into the on mode releasing the connection from the first tab 32G and second tab 32H, respectively. This would cause the pan 32 to drop to the ground from the nested configuration with the remaining pan 34. The memory module would then create a record that may be accessed to remember that the third pan 32 had been deployed to the ground.

Further, the signal controller 26 may generate yet a further activation signal transmitted to the signal receiver 24 then transmitted to the controller which switches from the off mode to the triggered or on mode upon receipt of the activation signal. The memory module, knowing that the first pan 28, second pan 30, and third pan 32 had been dropped, would then drop the fourth pan 34. In the case of the fourth pan 34, the controller would trigger the magnet 22D and the magnet 22E to trigger into the on mode and thus release connection from the first tab 34G and second tab 34H, respectively. This would cause the pan 34 to drop to the ground. The memory module would then create a record that may be accessed to remember that the fourth pan 34 had been deployed to the ground.

Further configurations may use additional pans, and may use N pans. In such a case, the memory module would be operative to create and read data bearing records related to the number of pans that were still in the nested configuration versus those which were deployed. Further, additional magnets would be required to attach additional pans.

Figure 5:
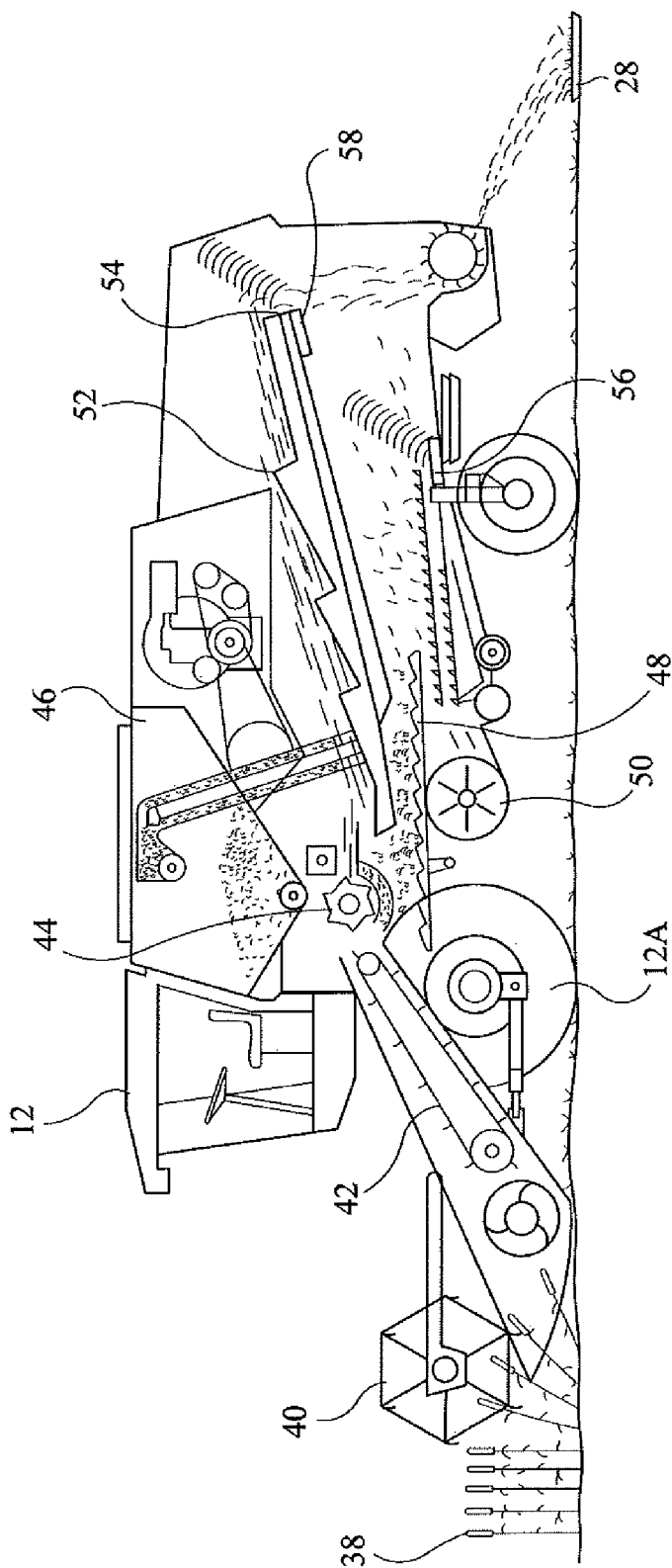
FIG. 5 is an exemplary side view of a combine with a pan dropped in a field.

Referring now to FIG. 5, an exemplary combine with pans shown attached to the combine 12 as well as in the field are shown. Typically, the combine harvester 12 includes a vehicle body supported on at least two ground engaging wheels 12A for rolling movement in a forward working direction over ground. Often times that ground is carrying a crop 38 to be harvested. A header at the front end of the vehicle body includes a cutter bar 40 that spans laterally and perpendicularly to the forward working direction for cutting the crop 38 as the harvester 12 is displaced forwardly across the ground along a first direction.

The now cut crop is guided internally through the vehicle body by a feeder 42 to be threshed by a threshing 44 which functions to dislodge the grain from the remaining cut crop materials defining chaff. The crop 38 goes into a grain tank 46 while the chaff continues outward the body of the combine 12. Sieves 48 within the harvester receive the material from the thresher for separating the grain from the chaff. A blower fan 50 is used to carry the chaff to a rear discharge of the harvester for discharging the chaff onto the ground along the bottom while a series of straw walkers 52 allow the straw of a top path to be chopped by a chopper 54 to be deposited on the ground. Depending upon the configuration of the sieves and the blower speed, varying amounts of grain from the crop can be undesirably blown from the combine harvester together with the chaff. As such, it is necessary to determine the amount of grain from crop that is interspersed with the discharged chaff in order to determine combine efficiency and optimize it for the crop.

Once a pan is dropped, the user may then collect the material deposited on the pan and separate the grain from the chaff using a separator sieve or other such device as known in the art. A measuring tube, or scale, or otherwise marked device for measuring the amount of grain collected in the pan would then be used. The various markings represent volume of grain per unit of collection area of the pan or may be weighed to give a numerical amount. Specifically, one may design a pan so that the collection area of the pan corresponds to a length of a header of the combine harvester 12 in a lateral direction of the combine harvester 12 by a width of the collection pan transverse to the lateral direction. Then, one is able to use correlation data between the volume or weight of grain collected in the pan and the length of the header of the combine harvester for the specified width of the collection pan and a specified grain type, the volume of separated grain in the measuring tube can be used to determine grain loss in units of bushels per acre.

Once a measure of grain loss has been determined, suitable adjustments can be made to the configuration of the combine harvester 12 including the configuration of the sieves 48 or the blower 50 speed for example to minimize and optimize the amount of grain loss during normal operation of the combine harvester 12. Then, when it is desirable to gauge the grain loss of a different combine harvester 12, or at a different portion of the combine harvester 12, the main cover 14 housing the pans 28, 30, 32, 34 are simply relocated to the different combine or alternative location on the vehicle body by releasing the magnets 18 and moving the main cover 14 together with the pans 28, 30, 32, 34 to the different combine or alternative location on the vehicle body.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clarity, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A system to detect grain loss of a harvester during harvesting operations, comprising:
 a first pan and a second pan, the first pan magnetically supported on the harvester above a ground surface by a first electromagnet, the second pan magnetically supported on the harvester above the ground surface by a second electromagnet, the first electromagnet being electrically isolated from a power source while magnetically supporting the first pan on the harvester, the second electromagnet being electrically isolated from the power source while magnetically supporting the second pan on the harvester;
 a signal controller arranged to generate a release signal when triggered by a user;
 a signal receiver responsive to the generated release signal to electrically connect the first electromagnet with the power source and releasing the first pan to the ground surface while the second electromagnet remains electrically isolated from the power source and remaining magnetically supported on the combine harvester;
 the signal receiver responsive to the generated release signal to electrically connect the second electromagnet with the power source and releasing the second pan to the ground surface.

2. The system of claim 1, further comprising:
 a cover attached to the harvester, the cover having a top member and side members defining an open bottom end oriented toward the ground surface;
 wherein the first pan and second pan are received within the open bottom end of the cover.

3. The system of claim 2, wherein the first and second electromagnets are attached to the top member of the cover.

4. The system of claim 2, wherein the cover is magnetically attached to the harvester with permanent magnets.

5. The system of claim 1, wherein the second pan is received within the first pan in nested relation.

6. A system to collect samples of crop material discharged by a harvester during harvesting operations, the system comprising:
 a first pan magnetically supported on the harvester above a ground surface by a first set of electromagnets in a default holding state;
 a second pan magnetically supported on the harvester above the ground surface by a second set of electromagnets in a default holding state;
 a signal controller configured to transmit a signal upon actuation by a user;
 a control circuit configured to switch the first set of electromagnets from the default holding state to a release state in response to the signal transmitted by the signal controller upon a first actuation of the signal controller by the user, while maintaining the second set of electromagnets in the default holding state, the control circuit configured to switch the second set of electromagnets from the default holding state to a release state in response to the signal transmitted by the signal controller upon a second actuation of the signal controller by the user;
 whereby, when the first set of electromagnets are switched to the release state, the first set electromagnets lose magnetism causing the first pan to drop from the harvester to the ground surface;
 whereby, when the second set of electromagnets are switched to the release state, the second set electromagnets lose magnetism causing the second pan to drop from the harvester to the ground surface;
 whereupon the first pan that has dropped to the ground surface collects a first sample of crop material discharged by the harvester during harvesting operations and the second pan that has dropped to the ground surface collects a second sample of crop material discharged by the harvester during harvesting operations.

7. The system of claim 6, further comprising:
 a cover mounted to the harvester, the cover having a top member and side members defining an open bottom end oriented toward the ground surface;
 wherein the first pan and second pan are received within the open bottom end of the cover.

8. The system of claim 7, wherein the first and second sets of electromagnets are attached to the top member of the cover.

9. The system of claim 7, wherein the cover is magnetically attached to the harvester with permanent magnets.

10. The system of claim 6, wherein the second pan is received within the first pan in nested relation.

11. A method of collecting samples of crop material discharged by a harvester while harvesting a crop in a field, the method comprising:

magnetically supporting a first pan on the harvester above a ground surface with a first set of electromagnets in a default holding state;

magnetically supporting a second pan on the harvester above a ground surface with a second set of electromagnets in a default holding state;

selectively switching the first set of electromagnets from the default holding state to a release state causing the first pan to drop from the harvester to the ground surface in a first desired location in the field while the second pan remains supported on the harvester by the second set of electromagnets remaining in the default holding state;

selectively switching the second set of electromagnets from the default holding state to a release state causing the second pan to drop from the harvester to the ground surface in a second desired location in the field;

whereupon the first pan that has dropped to the ground surface collects a first sample of crop material discharged by the harvester during harvesting operations and the second pan that has dropped to the ground surface collects a second sample of crop material discharged by the harvester during harvesting operations.

12. The method of claim 11, further comprising:

attaching a cover to the harvester before magnetically supporting the first and second pans on the harvester, wherein the cover includes a top member and side members defining an open bottom end oriented toward the ground surface;

after attaching the cover to the harvester, magnetically supporting the first and second pans from the top member of the cover with the respective first and second sets of electromagnets in their default holding state such that the first and second pans are received within the open bottom end of the cover.

13. The method of claim 12, the cover is attached to the harvester by permanent magnets.

14. The method of claim 11, wherein the second pan is received within the first pan in nested relation.

* * * * *